March 21, 1967 H. PUTNAM 3,310,748

STRIP LINE HYBRID RING AND BALANCED MIXER ASSEMBLY

Filed March 18, 1963 2 Sheets-Sheet 1

INVENTOR.
HOWARD PUTNAM

March 21, 1967 H. PUTNAM 3,310,748
STRIP LINE HYBRID RING AND BALANCED MIXER ASSEMBLY
Filed March 18, 1963 2 Sheets-Sheet 2

INVENTOR.
HOWARD PUTNAM

United States Patent Office 3,310,748
Patented Mar. 21, 1967

3,310,748

STRIP LINE HYBRID RING AND BALANCED MIXER ASSEMBLY

Howard Putnam, Nashua, N.H., assignor to Sanders Associates, Inc., Nashua, N.H., a corporation of Delaware Filed Mar. 18, 1963, Ser. No. 265,857
7 Claims. (Cl. 325—446)

Figure 1:
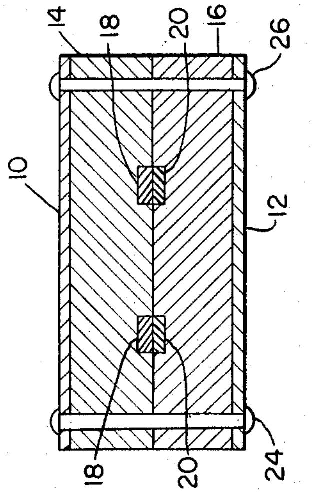

The present invention relates to a microwave mixer assembly. More particularly, it relates to an improved balanced mixer assembly, of strip transmission line construction, in which the diode crystals are incorporated in the transmission line and electrically connected in series with the central conductive strip thereof.

With the advent of strip transmission lines, it became possible to fabricate microwave circuit components utilizing printed-circuit techniques. This greatly simplified production and permitted such components to be made light in weight and compact. One type of strip transmission line now in use employs a conductive strip interposed between two outer ground plane conductors, with the outer conductors maintained at equal potential. By this construction, leakage of RF energy is reduced to a minimum.

In the past, a number of microwave circuits employing components such as various types of diodes have been fabricated with strip lines. The components have been housed separately from the strip line, with leads connecting the components to the central conductive strip. This gives rise to numerous problems, such as appreciable inductive reactance at high frequencies, impedance mismatch and undesirable oscillations.

In copending application, Ser. No. 41,420, filed July 7, 1960, now abandoned, and assigned to the assignee of the present application, it is proposed that controlled circuit elements be packaged in strip transmission lines. This minimizes the effect of such factors as lead reactance and reduces the size of the resultant assemblies.

The specific application contemplated for the invention is in airborne, frequency modulated radar systems employed as FM altimeters. An FM altimeter makes use of a transmitter whose frequency is periodically swept back and forth. The output of the transmitter is fed to an antenna and the resulting radiation pattern is directed from the vehicle toward the earth's surface. The reflected signal incident on a separate receiving antenna is applied to one input of a mixer. A second input to the mixer, which constitutes the local oscillator signal, is obtained directly from the transmitter. The frequencies at the two mixer inputs differ by the amount of change in frequency of the transmitter during the time it takes for the transmitted signal to traverse the path to the earth and return. Therefore, this frequency difference or beat frequency, which appears at the output of the mixer, depends on the altitude of the vehicle. A circuit which measures the beat frequency determines this altitude with considerable accuracy.

It is a primary object of the present invention to provide a microwave mixer assembly of improved construction which incorporates the desirable features of low cost, reduced size, improved sensitivity and performance.

An additional object is to provide a mixer assembly which achieves appreciable isolation between the radio frequency and the beat frequency portions of the circuit.

A further object of the invention is to provide a balanced mixer assembly of strip line construction which is adaptable to miniaturization and susceptible to economical quantity manufacture.

A still further object is to provide a balanced mixer assembly of strip line construction possessing the characteristics of compact size, light weight and durability which are necessary attributes of airborne equipment.

An additional object is to provide a balanced mixer assembly having particular application in airborne FM radar systems.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Figure 2:
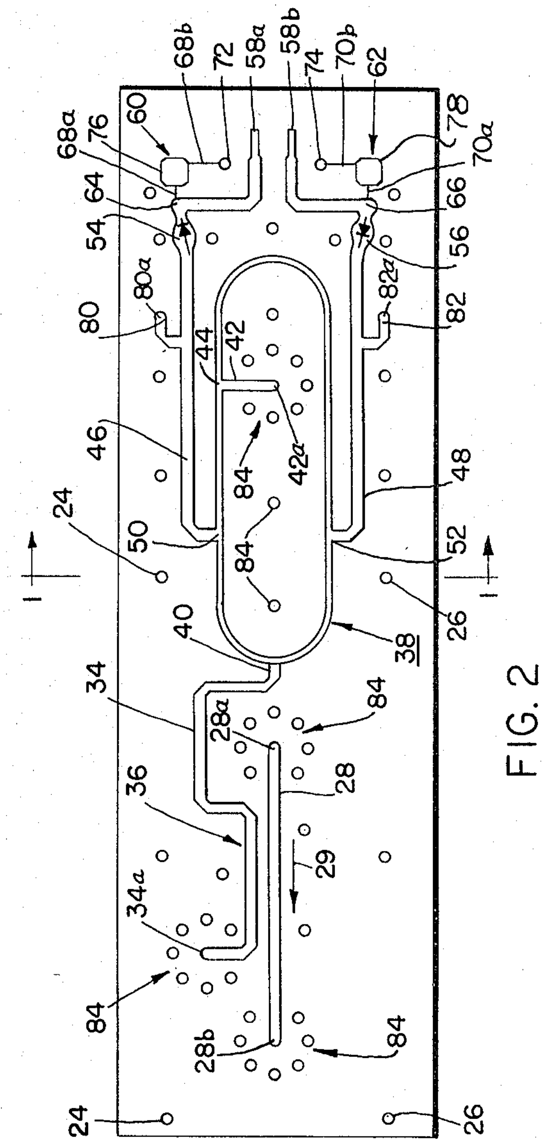
Figure 3A:
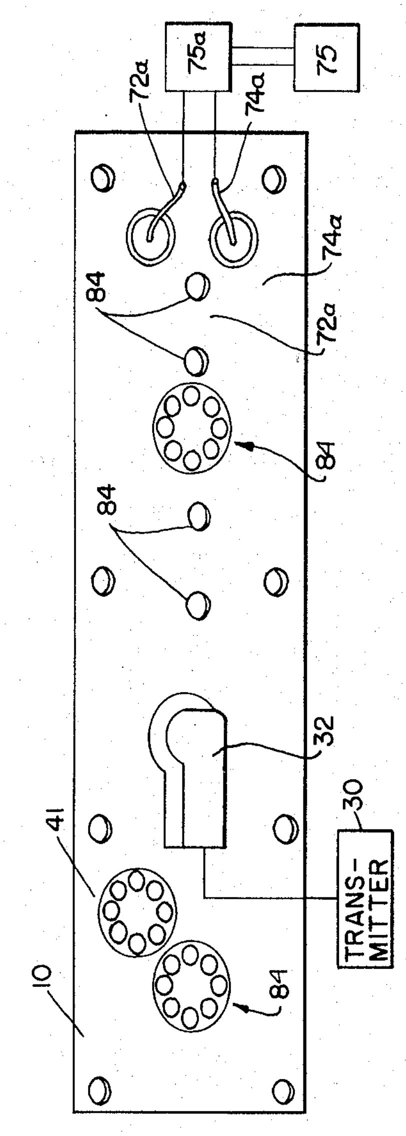
Figure 3B:
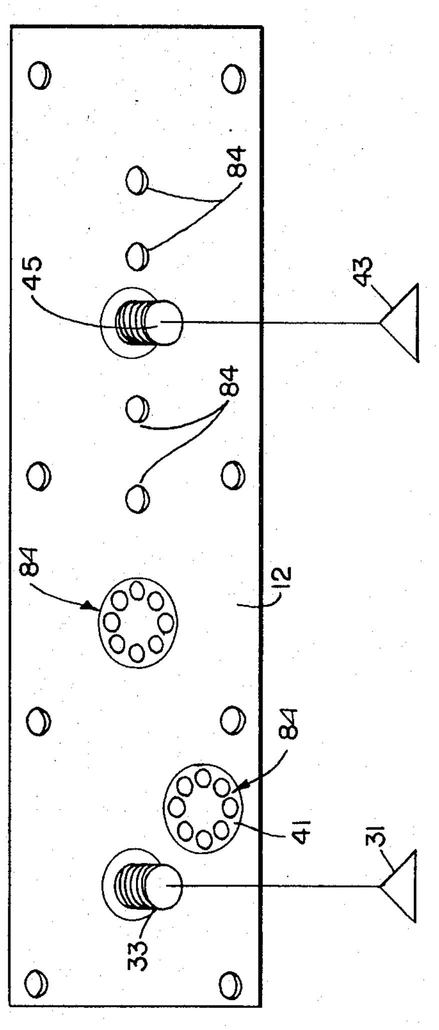

For a fuller understanding of the nature and objects of the invention, reference should be had to the following detailed description taken in connection with the accompanying drawings, in which:

FIG. 1 is a cross-sectional view, taken along line 1—1 in FIG. 2, of the mixer assembly, FIG. 2 is a plan view of the mixer circuit showing the configuration of the center conductors, and FIGS. 3*a* and 3*b* are plan views of the mixer assembly showing the upper and lower ground planes, respectively, and the external connections to the center conductors.

In general, my invention provides a microwave receiver mixer assembly in which the diodes are disposed in gaps in the central conductive strips of a strip transmission line, with the strips serving also as the leads for the diodes. The preferred transmission line is of the type disclosed in U.S. Patent No. 2,810,892, which issued Oct. 22, 1958 to Daniel Blitz for "Transmission Line," and No. 2,812,501, which issued Nov. 5, 1957 to D. J. Sommers for "Transmission Line," wherein a center conductor is disposed midway between a pair of outer ground plane conductors.

In accordance with the FM altimeter operation described above, the local oscillator signals and the radio frequency signals from the receiving antenna are introduced to a hybrid ring at junctions which are so positioned as to effectively isolate the sources of these signals. The diodes are disposed in gaps and connected in series in output lines connected to the hybrid ring in such manner that the local oscillator signal arrives in phase at the two diodes while the received signal reaches the diodes 180° out of phase. By virtue of this arrangement, the local oscillator signal cancels in the diode output circuit, thereby preventing noise modulation of this signal from influencing the beat frequency signal output circuit. This output circuit is constructed and arranged with respect to the termination of the output lines in such manner as to achieve effective isolation from the rest of the circuit at microwave frequencies.

In FIG. 1 I have illustrated an enlarged cross section of the strip line mixer assembly constructed in accordance with my invention. The line has a pair of ground plane conductors 10 and 12 which are separated by layers 14 and 16 of dielectric material. Central conductors 18 and 20, in register with each other, are formed in the opposing surfaces of the dielectric layers 14 and 16. The ground plane conductors and the central conductive strip pairs are flat and may be quite thin. In practice, they may be formed of foil bonded to the layers of dielectric material, which maintain the central conductive strips in spaced relationship with the ground plane conductors. Conductive pins 24 and 26 are passed through the entire assembly and serve the dual purpose of maintaining the ground planes at equal potential and maintaining the constituent parts of the assembly in "sandwiched" relationship.

In FIG. 2, a plan view of the configuration of the central conductive strips to form a balanced mixer is shown. Although only one set of central conductive strips is shown in FIG. 2, there are in fact two, as seen in FIG. 1, each being the mirror image of the other.

In describing FIG. 2, reference is made also to FIGS. 3*a* and 3*b*, which show the ground plane conductors 10 and 12 and the various terminations and connectors for the central conductive strips. A conductive strip 28 conveys energy in the direction of the arrow 29 from the transmitter indicated schematically at 30 (FIG. 3*a*) to the transmitting antenna, indicated schematically at 31 in FIG. 3*b*. Connection of the strip 28 to the transmitter and the transmitting antenna is accomplished by strip line-to-coaxial connectors 32 and 33, shown in FIGS. 3*a* and 3*b*, connected to ends 28*a* and 28*b*, respectively. As seen in FIG. 2, a portion of the energy traveling in conductive strip 28 is coupled to a conductive strip 34 by means of a "parralel line" directional coupler indicated at 36. The coupled energy travels in the opposite direction in the strip 34 and is introduced to an elongated hybrid ring 38 at a junction 40. The conductive strips which form the ring 38 correspond to the strips 20 in FIG. 1. The left hand end 34*a* of conductive strip 34 is terminated in a load equal to its characteristic impedance to suppress reflections which might otherwise occur. This termination is shown in FIGS. 3*a* and 3*b* at 41.

A conductive strip 42 has one end 42*a* connected to a receiving antenna, indicated schematically at 43 through a strip line-to-coaxial connector 45, as shown in FIG. 3*b*. The return signal received by the receiving antenna is introduced to the hybrid ring 38 at junction 44 by the conductive strip 42, as seen in FIG. 2.

Output conductive strips or lines 46 and 48 are connected to the hybrid ring 38 at junctions 50 and 52, respectively. A diode 54 is electrically connected in series with conductive strip 46 while a diode 56 is likewise connected in conductive strip 48. By way of example, hybrid ring 38 has a circumferential length equal to 1.5 wavelengths at the operating frequency. Beginning at junction 40 and progressing clockwise around hybrid ring 38, junction 50 is positioned one-quarter wavelength from junction 40, junction 44 is positioned one-half wavelength from junction 40, while junction 52 is positioned one and one-quarter wavelengths from junction 40.

By this arrangement, as seen in FIG. 2, conductive strips 34 and 42 are effectively isolated from each other for signals at the radio frequency, since the portions of transmitter or local oscillator signal appearing on line 34 and traveling in opposite directions around hybrid ring 38 arrive at junction 44 substantially 180° out of phase and cancel each other. Correspondingly, the portions of the return signal appearing on conductive strip 42 and traveling around hybrid ring 38 in opposite directions cancel at junction 40. It will be noted that the portions of each signal traveling in opposite directions around the ring 38 arrive in phase at junctions 50 and 52 and therefore add at these points.

Diodes 54 and 56 receive the outputs appearing at the junctions 50 and 52 of the hybrid ring 38. The lines 46 and 48, continuing beyond the diodes 54 and 56, are terminated at 58*a* and 58*b*, respectively. These terminations are open circuits.

Beat frequency output filters, shown generally at 60 and 62, are connected to lines 46 and 48 at junctions 64 and 66, respectively. The junctions 64 and 66 are spaced from the terminations 58*a* and 58*b* by a distance equal to one-quarter wavelength at the radio frequency. Conductive strips 68*a*–68*b* and 70*a*–70*b* coupling the beat frequency output terminals 72 and 74 to the junctions 64 and 66, respectively, are made significantly narrower than lines 46 and 48 in order to present a high impedance to RF energy. Leads 72*a* and 74*a*, shown in FIG. 3*a*, connect the beat frequency output terminals 72 and 74, respectively, to beat frequency utilization circuits indicated schematically at 75 through an "audio" transformer 75*a*. Bypass capacitors, shown at 76 and 78, couple the lines 68*a*–68*b* and 70*a*–70*b*, respectively, to ground plane conductors 10 and 12 to prevent microwave signals from reaching terminals 72 and 74. As shown in FIG. 2, these capacitors are formed as enlarged conductive portions interconnecting strips 68*a* and 68*b*, and strips 70*a* and 70*b* to provide large capacitances between these strips and the ground planes.

Impedance matching stubs 80 and 82 are connected to lines 46 and 48, respectively, between diodes 54 and 56 and junctions 50 and 52. These matching stubs, which are connected at their outer ends 80*a* and 82*a* to the ground plane conductors, perform the dual function of impedance matching the diodes and providing a D.-C. return path for the diodes 54 and 56.

With further reference to FIG. 2, a plurality of conducting pins 84, which short the ground planes together, in the same manner as pins 24 and 26 of FIG. 1, are strategically placed with respect to the mixer circuit to provide isolation between the various portions of the circuit. These pins also serve to suppress undesirable modes of propagation, as disclosed in U.S. Patent No. 2,812,501.

In operation, the local oscillator signals arriving at the diodes 54 and 56 from the hybrid ring 38 are in phase, since the diodes are equidistant from the junction 40. Since the diodes are reversely poled with respect to junction 40, local oscillator noise which reaches the terminals 72 and 74 after rectification by the diodes, is cancelled out in the primary of the transformer 75*a*. More specifically, the transformer primary has a pair of windings, one connected to each of the terminals 72 and 74. These windings are returned to the ground plane system. The senses of the primary windings are opposed, so that the transformer has essentially no net flux corresponding to amplitude modulation of the local oscillator signal entering at the junction 40.

On the other hand, the return signals from the receiving antenna reach the diodes 180 degrees out of phase, since diode 54 is closer to the junction 44 than diode 56 by a distance equal to 0.5 wavelength at the radio frequency. Thus, the beat frequency signals resulting from mixing of the local oscillator and received signals in the diodes 54 and 56 are not cancelled in the transformer 75. Rather, the primary windings serve to add together the beat frequency signals appearing at the terminals 72 and 74.

The junction 64 of beat frequency filter 60 is one-quarter wavelength from the termination 58*a* of line 46, and thus it is located at a point on line 46 where the RF voltage is zero. Put another way, the impedance reflected from the open circuit termination a quarter wavelength away is zero. This identical relationship obtains for the radio frequency signals on the line 48 at the termination 58*b* and at the junction 66 of filter 62. Since there is essentially no radio frequency potential at either of the junctions 64 and 66 little or no energy will flow into the beat frequency filters 60 and 62.

Further isolation of the transformer 75 from the radio frequency portions of the mixer circuit is provided by the lines 68*a*–68*b* and 70*a*–70*b* which connect the audio output terminals 72 and 74 to the output lines 46 and 48. As pointed out above, the lines 68*a*–68*b* and 70*a*–70*b* are significantly smaller in width than the output lines to which they are connected. By this arrangement, a high series impedance to radio frequency energy is provided. The high series impedances of strips 68*a* and 70*a*, together with the low shunt impedances provided by the capacitors 76 and 78, serve as low pass filters which prevent appreciable radio frequency energy from reaching the terminals 72 and 74.

It will be noted that, at the low beat frequency, the reflected impedances from the terminations 58*a* and 58*b* are essentially open circuits. Moreover, the impedances of the lines 46 and 48 are low and the impedances of the capacitors 76 and 78 are high, at the beat frequencies. Accordingly, the beat frequency signal reach the terminals 72 and 74 without appreciable attenuation.

Although the diodes are shown as being physically disposed in gaps in the central conductive strips of one set, it should be understood that, in practice, the diodes are likewise incorporated in the other set of central conductive strips if two such sets in register with each other are used.

With the disclosed arrangement of the various parts of the invention, broad band operation is made possible. This is particularly desirable in FM altimeter applications, since the frequency of the transmitted signal may sweep through as much as 50 megacycles at a center frequency of 1600 megacycles. The reversely poled diodes function together with the transformer 75*a* to effect the cancellation of the local oscillator signals. The unique filtering action at the diode outputs and in the beat frequency filter circuits provides effective isolation of the beat frequency and the radio frequency portions of the mixer circuit at operating frequencies.

The invention thus described provides an improved balanced mixer assembly which is characterized by the features of simplicity of construction, compactness, light weight and improved sensitivity. This is accomplished by physically incorporating the diodes in the output lines of a hybrid ring with the output lines serving as the leads for the crystals. These output lines are preferably terminated in an open circuit while the beat frequency output circuits are connected to these output lines at points of zero radio frequency potential. The leads connecting the audio output terminals to the output lines are constructed to present a high impedance to RF energy. In addition, these leads are coupled to the ground planes by bypass capacitors to prevent radio frequency energy from reaching the beat frequency output terminals. The combination of these features insures substantial isolation of the audio output circuit from the radio frequency portions of the mixer circuit.

It will be understood that the hybrid ring output lines may be terminated in a short circuit, whereupon, the junctions to the beat frequency output circuit will be located at zero radio frequency potential one-half wavelength from the terminations. In order that the terminations remain as an open circuit to the beat frequency signal, the short circuit should be effected by means of large capacitive coupling between the ring output lines (i.e., at 58*a* and 58*b*) and the ground planes.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A balanced mixer assembly of strip transmission line construction, said mixer assembly comprising:

(a) a hybrid ring,
(b) a first conductive strip for introducing local oscillator signals to said hybrid ring,
(c) a second conductive strip for introducing received signals to said hybrid ring,
(d) a first output line connected to said hybrid ring,
(e) a second output line connected to said hybrid ring, (f) a first diode physically incorporated in said first output line,
(g) a second diode physically incorporated in said second output line,
(h) a first beat frequency output terminal,
(i) a second beat frequency output terminal,
(j) first means connecting said first beat frequency output terminal to said first output line at a point where said first output line presents substantially zero impedance to energy at the frequency of said local oscillator signals,
(k) second means connecting said second beat frequency output terminal to said second output line at a point where said second output line presents substantially zero impedance to energy at the frequency of said local oscillator signals.

2. The mixer assembly claimed in claim 1 wherein each of said first and second connecting means comprises a conductive strip of significantly smaller width than said first and second output lines.

3. The mixer assembly claimed in claim 2 wherein each of said first and second connecting means further includes a bypass capacitor in the form of an enlarged conductive portion of said connecting means therein, thereby to provide a low impedance shunt for energy at the frequency of said local oscillator signals.

4. The mixer assembly defined in claim 2 wherein said first and second diodes are reversely poled with respect to said local oscillator signals.

5. A strip line microwave mixer assembly of the type including a pair of ground plane conductors and central conductive strips, said mixer assembly comprising:

(a) a hybrid ring,
(b) a first conductive strip for introducing local oscillator signals to said hybrid ring,
(c) a second conductive strip for introducing received signals to said hybrid ring,
(d) an output line connected to said hybrid ring,
(e) a diode physically incorporated in and electrically connected in series with said output line,
(f) a beat frequency output terminal,
(g) means connecting said output terminal to said output line at a point between said diode and the termination of said output line where the reflected impedance of said termination is substantially zero, and
(h) a matching stub having one end coupled to said output line at a point intermediate said diode and said hybrid ring and the other end connected to at least one of said ground plane conductors.

6. The mixer assembly claimed in claim 5 wherein said connecting means includes a conductive lead of substantially narrower width than said output line.

7. The mixer assembly defined in claim 6 wherein a bypass capacitor couples said conductive lead to said ground plane conductors.

References Cited by the Examiner

UNITED STATES PATENTS

| | | | |
|---|---|---|---|
| 2,868,966 | 1/1959 | Arditi | 325—445 X |
| 2,943,192 | 6/1960 | Liss | 325—446 |
| 3,029,396 | 4/1962 | Sichak | 332—47 X |
| 3,243,731 | 3/1966 | Erickson | 332—43 |

KATHLEEN H. CLAFFY, *Primary Examiner.*

R. S. BELL, *Assistant Examiner.*